(12) United States Patent
Suzuki

(10) Patent No.: US 6,814,056 B2
(45) Date of Patent: Nov. 9, 2004

(54) CONTACTLESS IGNITION SYSTEM FOR INTERNAL COMBUSTION ENGINE

(75) Inventor: Shigeyuki Suzuki, Yokosuka (JP)

(73) Assignee: Oppama Industry Co., Ltd., Yokosuka (JP)

(*) Notice: Subject to any disclaimer, the term of this patent is extended or adjusted under 35 U.S.C. 154(b) by 0 days.

(21) Appl. No.: 10/614,780

(22) Filed: Jul. 9, 2003

(65) Prior Publication Data

US 2004/0020479 A1 Feb. 5, 2004

(30) Foreign Application Priority Data

Jul. 11, 2002 (JP) ......................................... 2002-202819

(51) Int. Cl.[7] ................................................. F02P 5/06
(52) U.S. Cl. ................................... 123/406.57; 123/599
(58) Field of Search ...................... 123/406.56, 406.57, 123/599

(56) References Cited

U.S. PATENT DOCUMENTS

| | | | | |
|---|---|---|---|---|
| 4,335,692 A | * | 6/1982 | Miura | 123/406.57 |
| 4,344,395 A | * | 8/1982 | Kondo et al. | 123/406.57 |
| 4,566,425 A | * | 1/1986 | Nitou et al. | 123/406.57 |
| 4,596,226 A | * | 6/1986 | Kondo et al. | 123/406.57 |
| 5,419,295 A | * | 5/1995 | Andersson | 123/406.57 |
| 6,584,957 B2 | * | 7/2003 | Iwata et al. | 123/406.57 |

* cited by examiner

*Primary Examiner*—Tony M. Argenbright
(74) *Attorney, Agent, or Firm*—Michael D. Bednarek; Shaw Pittman LLP

(57) ABSTRACT

A contactless ignition system is provided with an ignition charge discharge condenser for charging an induced voltage of a generating coil, a first switching element, triggered to conduct when an induced voltage of a generating coil reaches a predetermined level, for supplying a charged voltage into an ignition coil, and a trigger control condenser for charging induced voltages of the generating coil and the trigger coil, and triggering of the first switching element caused by an induced voltage of the generating coil is inhibited by a second switching element during a specified discharge time following charging of the trigger control condenser.

4 Claims, 4 Drawing Sheets

CONTACTLESS IGNITION SYSTEM FOR INTERNAL COMBUSTION ENGINE

BACKGROUND OF THE INVENTION

1. Technical Field

The present invention relates to a contactless (non-contact) ignition system for an internal combustion engine for automatically subjecting ignition timing to spark advance control and spark retardation control from a low rotational speed range to a high rotational speed range.

2. Related Art

As a contactless ignition system for an internal combustion engine of the related art, for example, at the time of rotation of a rotor having magnetic poles, a generating coil charges an induced voltage into an ignition charge and discharge condenser, and electrical charge charged into the ignition charge and discharge condenser is supplied to an ignition coil through switching elements that are switched by a voltage induced by a trigger coil.

In this type of contactless ignition system, if the rotational speed of the internal combustion engine, namely the rotational speed of the rotor, is increased, then together with that increase in speed the charge discharge timing of the ignition charge discharge condenser is advanced, and finally the rotational speed of the internal combustion engine is increased in excess of a set rotational speed and sometimes results in damage to the engine.

Devices adopting a governor mechanism and devices utilizing electronic control have therefore been proposed as devices for preventing overspeed of an internal combustion engine.

However, the governor mechanism requires a large operating space because of expansion and contraction effects while rotating integrally with a crank shaft, and there is the drawback that lifespan is shortened due to mechanical operation.

Also, with an engine overspeed prevention device that uses electronic control, there is a problem that because complicated electronic circuitry is used it is not possible to realize cost reduction.

SUMMARY OF THE INVENTION

The present invention has been conceived in view of the above described situation, and an object of the invention is to provide a compact and inexpensive contactless ignition system for an internal combustion engine that can improve starting performance and horsepower while causing advancement of ignition timing from low engine speed to normal engine speed, and that can prevent engine overspeed by causing retardation of ignition timing at above normal engine speed.

In order to achieve this object, a contactless ignition system for an internal combustion engine of the present invention comprises a rotor having magnetic poles arranged either side of a magnet, a core with two legs, arranged opposite the rotor, wound with a trigger coil on the one leg and with a generating coil on the other leg positioned opposite to the rotational direction of the rotor with respect to the one leg, an ignition charge discharge condenser for charging an induced voltage of the generating coil, a first switching element, triggered to be conductive when an induced voltage of the generating coil has reached a predetermined (specified) trigger level, for supplying a voltage charged in the ignition charge discharge condenser to an ignition coil, a trigger control condenser for charging induced voltages of the generating coil and the trigger coil, and a second switching element for inhibiting a trigger of the first switching element caused by induced voltage of the generating coil for a specified time following charge of the trigger control condenser.

In the present invention, at the time of startup, since ignition timing of the internal combustion engine is advanced, kick back (a phenomenon where a piston is pushed back immediately after ignition and the crankshaft rotates backwards due to piston speed being slow when starting) does not occur, and stable startup and increased speed can be expected. Also, in a normal engine speed range, it is possible to sufficiently maintain horsepower of the engine by sufficiently advancing the ignition timing. On the other hand, in a high engine speed region in excess of the normal engine speed, since the ignition timing can be retarded there is the advantage that it is possible to prevent engine overspeed.

As a preferred embodiment, it is possible for the second switching element to be a transistor that short-circuits the two ends of the trigger coil within a specified time of discharge of the trigger control condenser, to inhibit triggering of the first switching element. In this way, triggering of the first switching element can be implemented using a low cost circuit structure.

As another preferred embodiment, it is possible for the trigger control condenser to comprise a time constant circuit for determining a discharge time constant of the trigger control condenser in order to achieve ignition timing retardation control. In this way, there is the advantage that it is possible to select rotational speed of the engine that causes the ignition timing retardation to start easily and with high precision by setting the discharge time constant of the time constant circuit.

As another preferred embodiment, it is possible to provide a circuit protection trigger circuit to trigger the first switching element in a high voltage below capacity voltage of the ignition charge discharge condenser. In this embodiment, charge volume does not go beyond capacity voltage of the ignition charge discharge condenser. Therefore, it is possible to prevent damages of each section of the circuit including the ignition charge discharge condenser.

PREFERRED EMBODIMENT OF THE INVENTION

Figure 2:
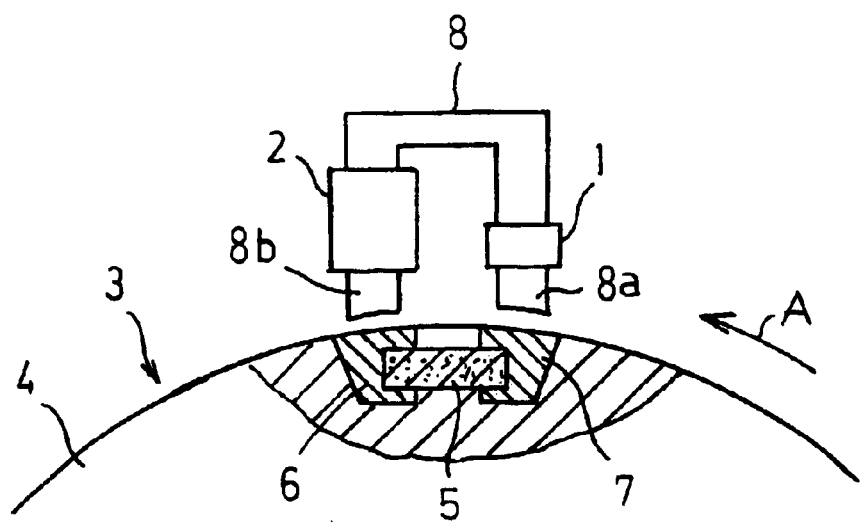
FIG. 2 is a front elevation showing a partial cross section of the essential structure of the contactless ignition system of FIG. 1.

In FIG. 2, a rotor 3 constituting a contactless (non-contact) ignition system for an internal combustion engine of this embodiment has a pair of magnetic poles 6 and 7 either side of a magnet 5 embedded in a non-magnetic body 4 such as a body of aluminum, for example. Part of each of the magnetic poles 6 and 7 are exposed at an outer surface of the rotor 3, and can be made opposite to end surfaces of two legs 8a, 8b of a core 8 during rotation of the rotor 3.

The core 8 is an angular U shaped-member facing the rotor 3, and a generating coil 1 and a trigger coil 2 are respectively wound around the legs 8a and 8b. The trigger coil 2 is wound around the one leg 8b, and the generating coil 1 is wound around the other leg 8a positioned opposite to the rotational direction of the rotor 3 with respect to the one leg 8b. Surfaces of the legs 8a and 8b opposite to the rotor 3 are formed in an arc shape so as to maintain a constant distance from the rotor 3.

Figure 1:
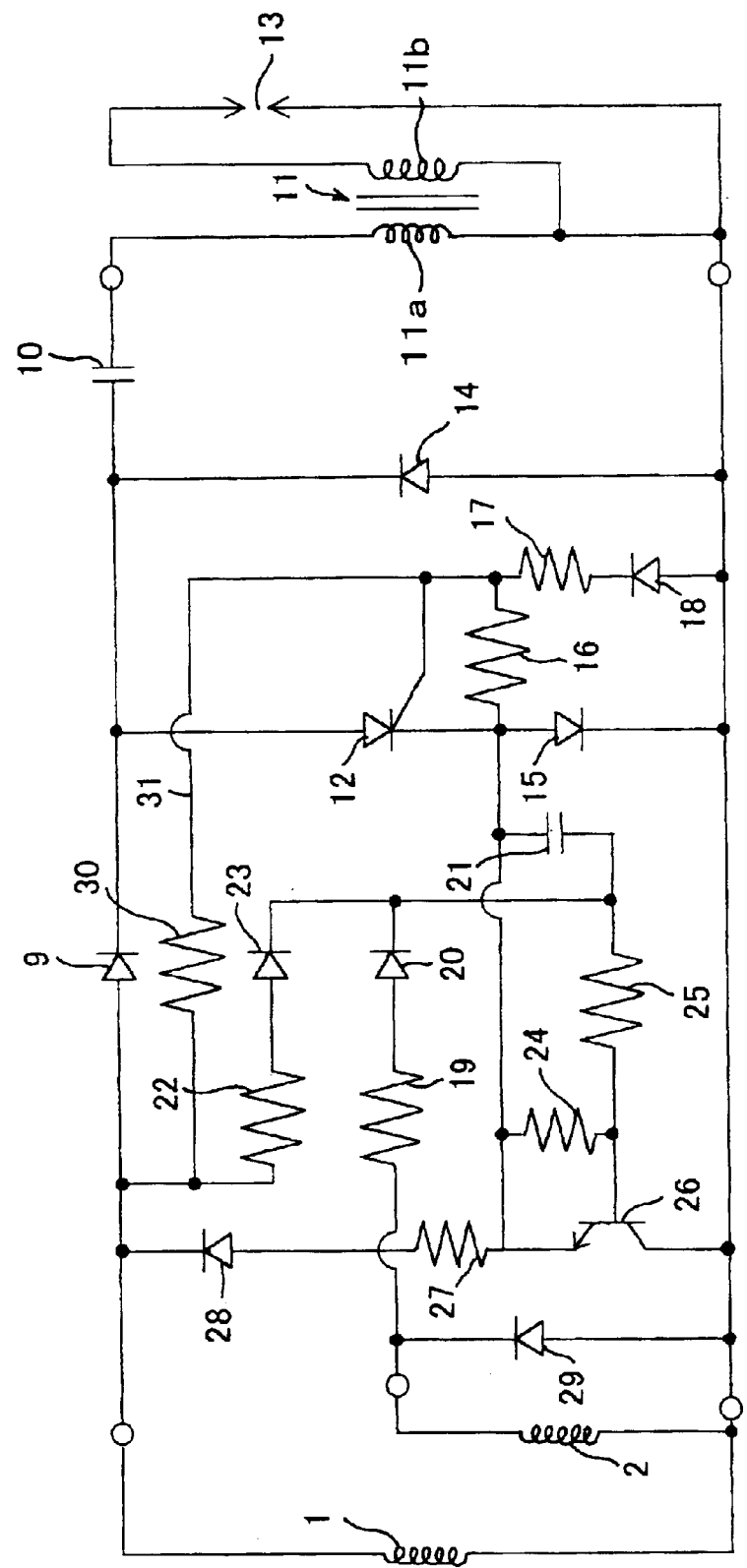
FIG. 1 is a circuit diagram showing a contactless ignition system for an internal combustion system of an embodiment of the present invention.

In FIG. 1, a diode 9, an ignition charge discharge condenser 10 and a primary coil 11a of an ignition coil 11 are connected in series with the generating coil 1, thus constituting a charging circuit for charging a positive voltage induced by the generating coil 1.

The ignition charge discharge condenser 10 is connected in series with the anode and cathode of a thyristor 12, as a first switching element, a diode 15 and the primary coil 11a of the ignition coil 11, and this series connection constitutes a discharge circuit for discharging charged up charge of the ignition charge discharge condenser 10. This discharge circuit functions to discharge charge charged into the ignition charge discharge condenser 10 to the ignition coil 11 when the thyristor 12 is triggered and made to conduct.

A spark plug 13 is connected to the secondary coil 11b of the ignition coil 11, and an LC oscillation diode 14 for the primary side of the ignition coil 11 is connected between the anode and cathode of the thyristor 12.

A resistor 16 connects the gate of the thyristor 12 to the point of connection between the cathode of the thyristor 12 and the diode 15. A series circuit comprising a resistor 17 and a diode 18 is connected in parallel to the diode 15 through the resistor 16.

On the other hand, a resistor 19, a diode 20, a trigger control condenser 21 and the diode 15 are connected in series to the two ends of the trigger coil 2. Also, a resistor 22 and a diode 23 are connected in series between a circuit linking the generating coil 1 with the diode 9 and a circuit linking the diode 20 with the trigger control condenser 21.

Resistors 24 and 25 constituting a time constant circuit together with the trigger control condenser 21 are connected in series to the two ends of the trigger control condenser 21, and the base of a transistor 26, as a second switching element, is connected to the point of connection between these two resistors 24 and 25. The collector of the transistor 26 is connected to a circuit linking one end of the trigger coil 2 and the diode 15. Also, the emitter of the transistor 26 is connected to a circuit linking the generating coil 1 and the diode 9 through a resistor 27 and a diode 28. The collector of the transistor 26 is also connected to the gate of the thyristor 12 through the diode 18 and the resistor 17. A reverse current prevention diode 29 is connected to the two ends of the trigger coil 2. Also, a circuit protection trigger circuit 31 having a resistor 30 is connected between the circuit linking the generating coil 1 with the diode 9 and the gate of the thyristor 12. The circuit protection trigger circuit 31 triggers the thyristor 12 in a high voltage below capacity voltage of the ignition charge discharge condenser 10.

Figure 3:
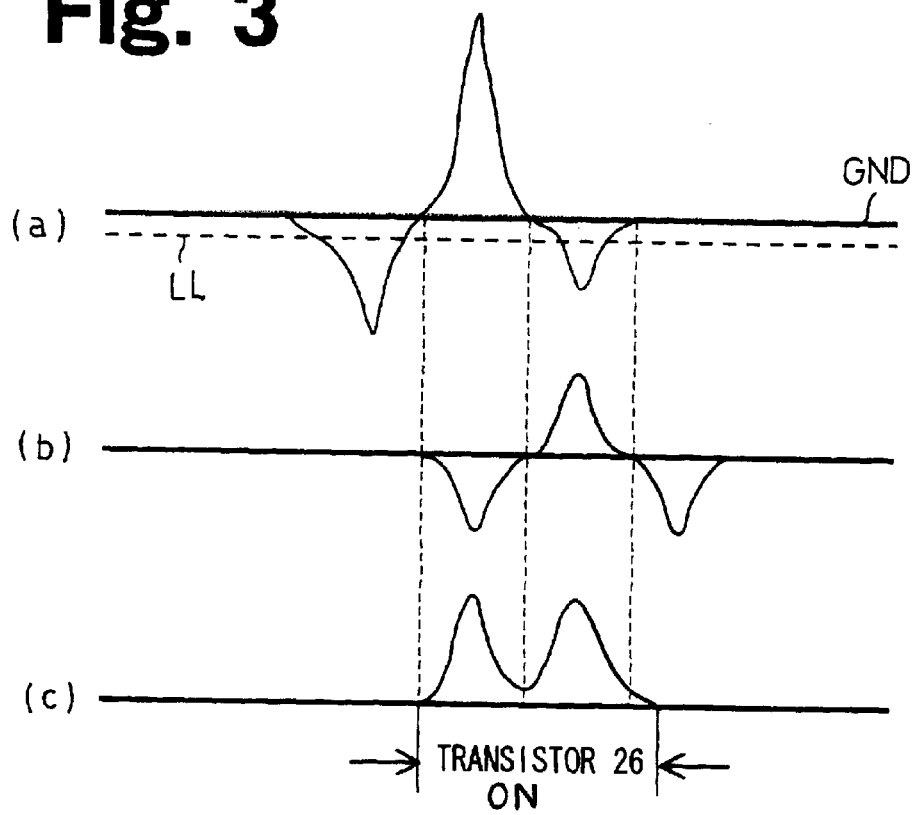
FIG. 3 is a timing chart showing voltage waveforms for each section of the circuit shown in FIG. 1 in a normal rotational engine speed range.

Next, operation of the contactless ignition system for an internal combustion engine having the above-described structure will be described. First of all, if the engine is activated and the rotor 3 rotates in the direction of arrow A in FIG. 2, voltages having the waveforms shown in FIG. 3(a) and FIG. 3(b) are respectively induced in the generating coil 1 and the trigger coil 2 on the core 8 opposite the rotor 3. The induced voltage of the trigger coil 2 is generated later than the induced voltage of the generating coil 1. Of induced voltage in the generating coil 1, a positive voltage is applied to the primary coil 11a of the ignition coil 11 through the diode 9 and the ignition charge discharge condenser 10 and electric charge is charged into the ignition charge discharge condenser 10.

On the other hand, of voltage induced in the trigger coil 2, positive voltage rises later than the positive induced voltage of the generating coil 1, by a predetermined period, and this voltage charges the trigger control condenser 21 through the resistor 19 and the diode 20, 15. The trigger control condenser 21 is also charged by the positive induced voltage from the generating coil 1, to give a charge voltage waveform as shown in FIG. 3(c). After charging of the ignition charge discharge condenser 10, if the gate voltage of the thyristor 12 reaches a specified level, namely if the induced voltage of the trigger coils 2 reaches an initial trigger level LL shown in FIG. 3(a), the thyristor 12 is turned on and electric charge of the ignition charge discharge condenser 10 is supplied though the thyristor 12 to the ignition coil 11. As a result, an ignition voltage is applied from the ignition coil 11 to the spark plug 13, and a fuel air mixture inside the fuel chamber of the internal combustion engine is ignited. By repeating this operation, the engine is started and then increased in speed, and horsepower, being the engine output, is increased by advancing the ignition timing.

Then, in a process for changing induced voltage of the trigger coil 2 from positive to negative, charge having the charge voltage waveform shown in FIG. 3(c) that has been charged into the trigger control condenser 21 is discharged through the resistors 24 and 25 and the transistor 26 is turned on. As a result, the series circuit of the transistor 26, the resistor 27 and the diode 28 shunts the generating coil 1, and during this time triggering of the thyristor 12 is inhibited so the thyristor 12 is OFF.

Figure 4:
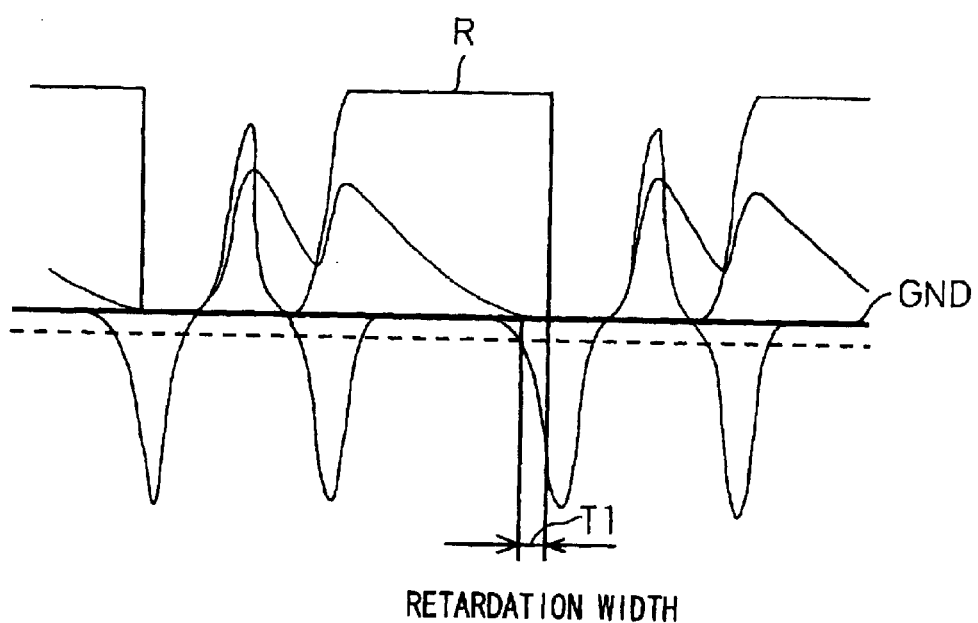
FIG. 4 is a timing chart showing voltage waveforms for each section of the circuit shown in FIG. 1 in a high rotational engine speed range.

Accordingly, when the engine speed becomes high beyond a normal speed range, the generating cycle of the induced voltage of the generating coil 1 becomes short. The width of the induced voltage on the time axis becomes wide, and, as shown in FIG. 4, the thyristor 12 is triggered late for a retardation width T1. Thereby, the discharge of the charge voltage R of the ignition charge discharge condenser 10 begins to be retarded. Specifically, as shown in FIG. 4, if the engine speed exceeds a normal engine speed corresponding to a set time constant of the time constant circuit, the ignition timing is gradually retarded, and as a result it is possible to prevent overspeed of the engine.

After starting the engine, from a low speed range to a specified normal speed range, reaching the normal speed NR, the ignition timing is not affected by the time constant and is advanced rapidly together with increase in engine speed. Accordingly, together with carrying out stable startup of the engine, it is possible to prevent the occurrence of kick back (a phenomenon where a piston is pushed back immediately after ignition and the crankshaft rotates in reverse due to slow piston speed at the time of startup) caused by delay on cranking, and since ignition timing is advanced as much as possible in the normal engine speed range it is possible to sufficiently maintain engine horsepower. Also, by using the trigger coil 2, it is possible to simplify the circuit structure for ignition timing control.

Figure 5:
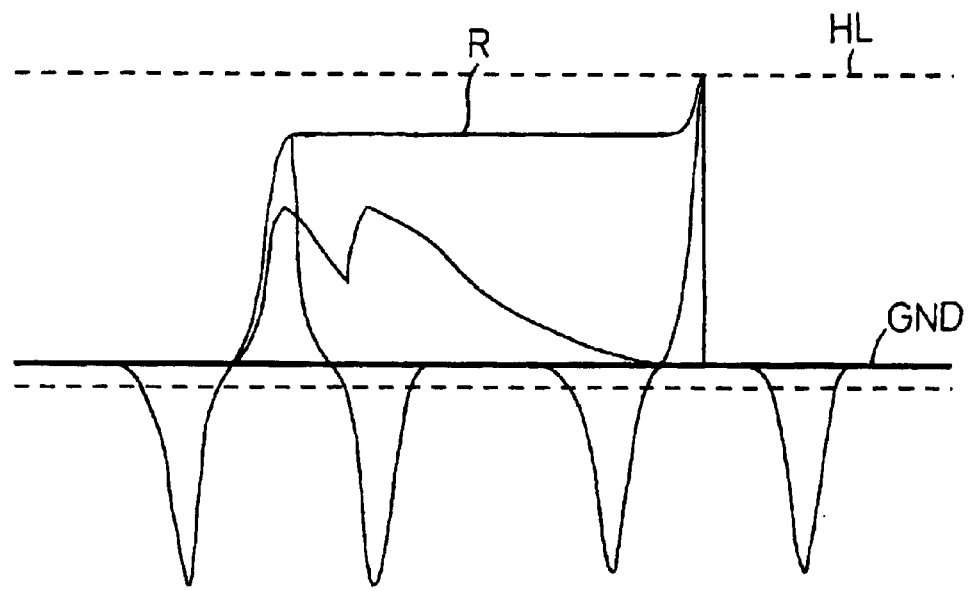
FIG. 5 is a timing chart showing voltage waveforms for each section of the circuit shown in FIG. 1 in an engine overspeed range.

On the other hand, if the engine speed becomes higher beyond the high speed range, the generating cycle of induced voltage of the generating coil 1 becomes shorter as shown in FIG. 5, and triggering of the thyristor 12 is inhibited when the transistor 26 turns on by the discharge voltage of the trigger control condenser 21. Thereby, supplying the ignition coil 11 with ignition current is prevented, and it is possible to prevent overspeed of the engine. At the same time, the charge voltage gradually rises in the ignition charge discharge condenser 10. When the charge voltage reaches a specified level HL below capacity voltage of the ignition charge discharge condenser 10, trigger current flows at the gate of the thyristor 12 through the resistor 30. Thereby, the thyristor 12 turns on and electrical charge of the ignition charge discharge condenser 10 is discharged into the ignition coil 11, which makes perfect the protection of the ignition charge discharge condenser 10 and other sections in the circuit.

What is claimed is:

1. A contactless ignition system for an internal combustion engine, comprising, a rotor having magnetic poles arranged either side of a magnet, a core with two legs, arranged opposite the rotor, wound with a trigger coil on the one leg and with a generating coil on the other leg positioned opposite to the rotational direction of the rotor with respect to the one leg, an ignition charge discharge condenser for charging an induced voltage of the generating coil, a first switching element, triggered to be conductive when an induced voltage of the generating coil has reached a predetermined trigger level, for supplying a voltage charged in the ignition charge discharge condenser to an ignition coil, a trigger control condenser for charging induced voltages of the charging coil and the trigger coil, and a second switching element for inhibiting a trigger of the first switching element caused by induced voltage of the generating coil for a specified time following charge of the trigger control condenser.

2. The contactless ignition system for an internal combustion engine according to claim 1, wherein the second switching element is a transistor for short-circuiting both ends of the trigger coil for a specified charging time of the trigger control condenser to prevent triggering of the first switching element.

3. The contactless ignition system for an internal combustion engine according to claim 1, wherein the trigger control condenser constitutes a time constant circuit for determining a discharge time constant of the trigger control condenser in order to perform ignition timing retardation control.

4. The contactless ignition system for an internal combustion engine according to claim 1, further comprising a circuit protection trigger circuit to trigger the first switching element in a high voltage below capacity voltage of the ignition charge discharge condenser.

* * * * *